United States Patent
Murayama (10) Patent No.: US 6,578,419 B1
(45) Date of Patent: Jun. 17, 2003

(54) ACCELERATION SENSOR (75) Inventor: Yasunori Murayama, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 09/700,860
(22) PCT Filed: Jun. 8, 1999
(86) PCT No.: PCT/JP99/03041
§ 371 (c)(1), (2), (4) Date: Nov. 17, 2000
(87) PCT Pub. No.: WO99/64871
PCT Pub. Date: Dec. 16, 1999

(30) Foreign Application Priority Data

Jun. 9, 1998 (JP) ............................................ 10/160954

(51) Int. Cl.⁷ ............................................. B60R 22/40
(52) U.S. Cl. ...................... 73/493; 242/384.6; 280/806; 297/478
(58) Field of Search .......................... 73/493; 280/806; 242/384.6, 384.5; 297/478

(56) References Cited

U.S. PATENT DOCUMENTS

| 5,622,383 A | 4/1997 | Kielwein et al. ........... 280/806 |
| 5,791,582 A | 8/1998 | Ernest | |
| 6,015,164 A | * 1/2000 | Yano ......................... 280/806 |

FOREIGN PATENT DOCUMENTS

| DE | 195 28 387 A1 | 2/1997 |
| DE | 195 31 320 A1 | 2/1997 |
| EP | 0 351 551 A2 | 1/1990 |
| EP | 0 700 812 A1 | 3/1996 |
| JP | 59-56168 | 3/1984 |
| JP | 1-202553 | 8/1989 |
| JP | 3-121058 | 12/1991 |
| JP | 11-180252 | 7/1999 |

* cited by examiner

Primary Examiner—John E. Chapman
(74) Attorney, Agent, or Firm—Knobbe Martens Olson & Bear LLP (57) ABSTRACT An acceleration sensor, which can always maintain a supporting body at a predetermined angle even when an inclining member is inclined and in which, moreover, a tilt lock angle is small. A substantially U-shaped limiting protrusion 136 is provided standing at a face wheel 130, and predetermined clearances are formed between the limiting protrusion 136 and a limiting shaft 138 of a bracket 40. When a seatback is inclined, the face wheel 130 rotates around an axis line J at the same angle as an angle of inclination of the seatback, and the bracket 40 is rotated with respect to the seatback by the load of a weight 118. Thus, a center line C of the bracket 40 is kept in a vertical direction. Even if a difference occurs between the angle of inclination of the seatback and the angle of rotation of the face wheel 130, the center line C of the bracket 40 is always in the vertical direction, within the clearances, due to the weight 118's own weight.

2 Claims, 12 Drawing Sheets

ACCELERATION SENSOR

TECHNICAL FIELD

The present invention relates to an acceleration sensor, more specifically, to an acceleration sensor, which, for example, is attached to an inclining member such as a seatback of a vehicle, and detects acceleration of the vehicle without being affected by an inclination of the inclining member.

PRIOR ART

An acceleration sensor for detecting acceleration of a vehicle or the like may include a sensor ball of predetermined mass disposed on a supporting surface of a supporting body such as a bracket, which sensor ball (moving body) inertially moves due to an acceleration at or above a predetermined value so as to drive an output member, and the sensor thereby detects the acceleration.

In a case in which this type of acceleration sensor is attached to an inclining member such as a seatback of a vehicle, the supporting surface of the bracket needs to be maintained at a predetermined angle so that the acceleration sensor can detect the predetermined acceleration even when the seatback is in a reclining position.

Accordingly, for example, a so-called dead load follow-up type of acceleration sensor, in which the bracket is rotatably supported around an axis which is parallel to a center of rotation of the seatback, a weight is attached below the axis, and, because of the load of the weight, the supporting surface of the bracket is maintained at a predetermined angle regardless of a reclining angle, has been suggested. However, the dead load follow-up type of acceleration sensor operates in the same manner when the seatback is inclined as when the entire vehicle is inclined. Therefore, if the acceleration sensor is set to not operate when the seatback is considerably inclined, the acceleration sensor does not operate when the entire vehicle is considerably inclined either (a so-called tilt lock angle is large).

On the other hand, a so-called linking follow-up type of acceleration sensor, in which a portion of a seat of the vehicle is connected to the bracket by a connecting member such as a wire and, when the seatback is inclined, the bracket is forcedly rotated by the connecting member and the supporting surface of the bracket is maintained at the predetermined angle, has been suggested. However, in the linking follow-up type of acceleration sensor, irregularities in the angle of forced rotation of the bracket are caused by slight deformations of the connecting member (for example, in a case in which a wire is used as the connecting member, a twist in the wire), slight looseness of a portion of the connecting member which is attached to the seat, and the like, and the supporting surface of the bracket cannot be maintained at the predetermined angle.

PROBLEM SOLVED BY THE INVENTION

In consideration of such facts, an object of the present invention is to obtain an acceleration sensor which can always maintain a supporting body at a predetermined angle even if an inclining member is inclined and, moreover, in which a tilt lock angle is small.

DISCLOSURE OF THE INVENTION

In the invention described in claim 1, an acceleration sensor comprises: a supporting body attached to an inclinable inclining member, which supporting body can rotate at least around an axis that is parallel to a center of inclination of the inclining member; a moving body supported to the supporting body, which moving body inertially moves due to an acceleration at or above a predetermined value applied to the supporting body, and drives an output member; a mass body, which, by a weight of the mass body, applies torque to the supporting body to a direction such that the supporting body has a predetermined angle with respect to a horizontal plane; and a rotating member, which followingly moves in accordance with an inclination of the inclining member, and enables the supporting body to be independently rotated within a predetermined range by the torque from the mass body such that the supporting body has the predetermined angle with respect to the horizontal plane.

When the inclining member is inclined, the supporting body receives torque from the mass body, and attempts to rotate in a direction in which the supporting body has a predetermined angle with respect to the horizontal plane. Because the rotating member rotates in accordance with the inclination, the supporting body rotates to the predetermined angle. When an acceleration at or above the predetermined value is applied to the supporting body in this state, the moving body inertially moves and drives the output member, and the acceleration is detected. The rotation of the supporting body, which is independent of the rotating member, is limited within the predetermined range by the rotating member. Thus, the acceleration sensor operates only when an acceleration at or above the predetermined value occurs or the entire vehicle is inclined, and the acceleration sensor does not operate when only the inclining member is inclined. Accordingly, a so-called tilt lock angle can be small.

Because of the rotating member, the supporting body can rotate independently of the rotating member within a predetermined range when the supporting body receives torque from the mass body. Therefore, even if an irregularity in follow-up movements of the rotating member with respect to the inclining member occurs due to, for example, looseness of a portion of the supporting body which is attached to the inclining member, deformation of the rotating member or the like, the supporting body rotates, due to the torque received from the mass body, in a direction in which the supporting body has a predetermined angle. Accordingly, the irregularity in follow-up movement of the rotating member is corrected and the supporting body has the predetermined angle with respect to the horizontal plane.

In the invention described in claim 2, according to the invention described in claim 1, the rotating member comprises: a wheel, which can rotate coaxially with the supporting body, and which rotates at a predetermined angle in accordance with an angle of inclination of the inclining member; a first abutting body provided so as to protrude from the wheel toward the supporting body; and a second abutting body provided so as to protrude from the supporting body toward the wheel, the first and second abutting bodies forming a predetermined clearance, and which second abutting body enables the supporting body to rotate independently of the rotating member within the clearance.

When the inclining member is inclined, the wheel rotates the predetermined angle in accordance with the angle of inclination. Thus, the first abutting body of the wheel followingly rotates with respect to the second abutting body of the supporting body, which attempts to rotate due to the torque from the mass body. Accordingly, the supporting body is allowed to rotate, and the supporting body has the predetermined angle with respect to the horizontal plane.

The predetermined clearances are formed between the first abutting body and the second abutting body. Therefore, even if a variation in a following angle of the first abutting body occurs when the inclining member is inclined, if the variation is within the clearances, the supporting body receives the torque from the mass body and rotates, and the supporting body has the predetermined angle with respect to the horizontal plane.

In this manner, due to a simple structure in which the first abutting body is provided at the wheel and the second abutting body is provided at the supporting body, even if a variation in a following angle (follow-up movement) of the first abutting body occurs, the supporting body can have the predetermined angle with respect to the horizontal plane.

PREFERRED EMBODIMENTS OF THE INVENTION

Figure 1:
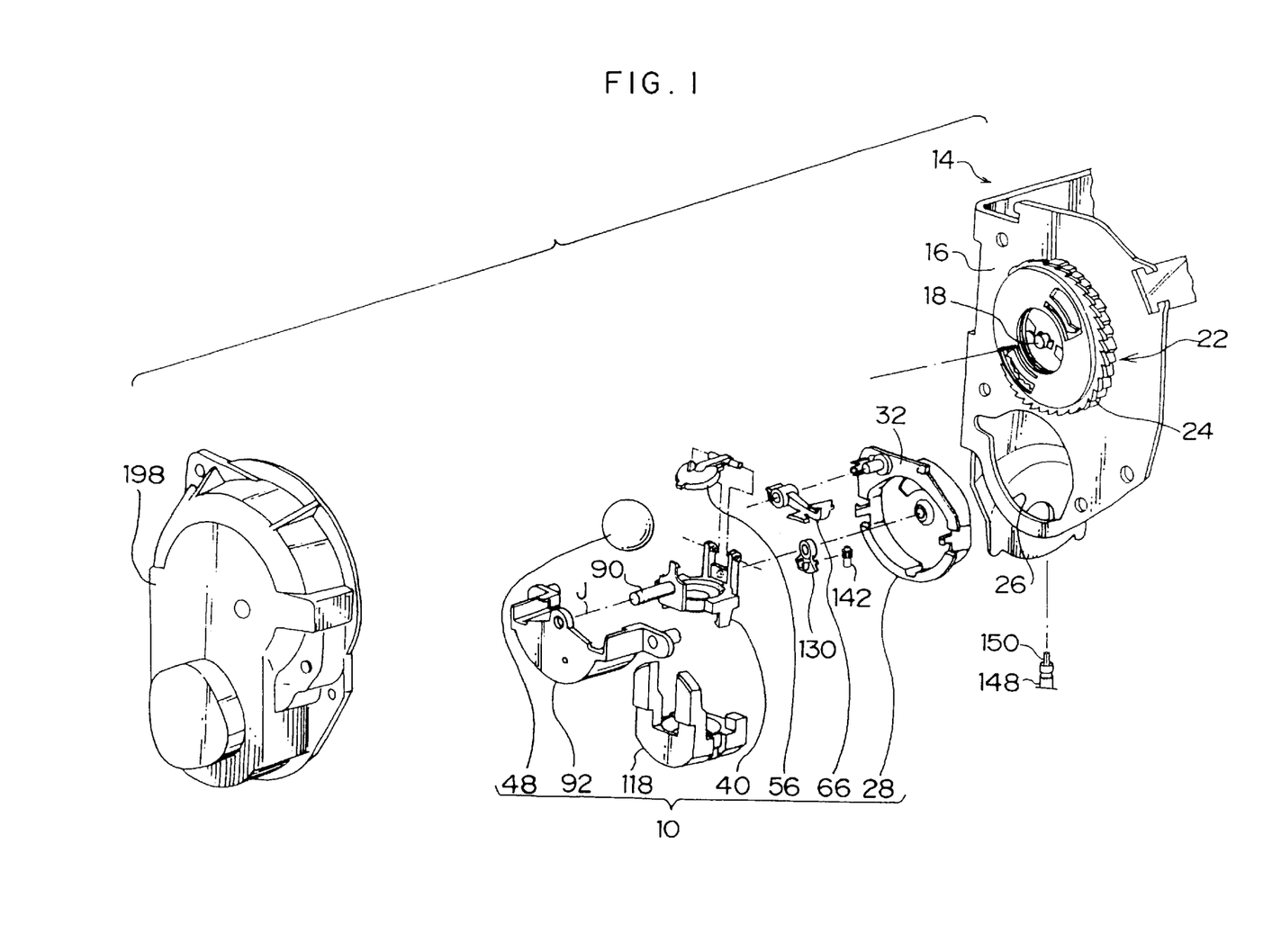
FIG. 1 is an exploded perspective view showing a portion of a retractor to which an acceleration sensor according to an embodiment of the present invention is attached.
Figure 2:
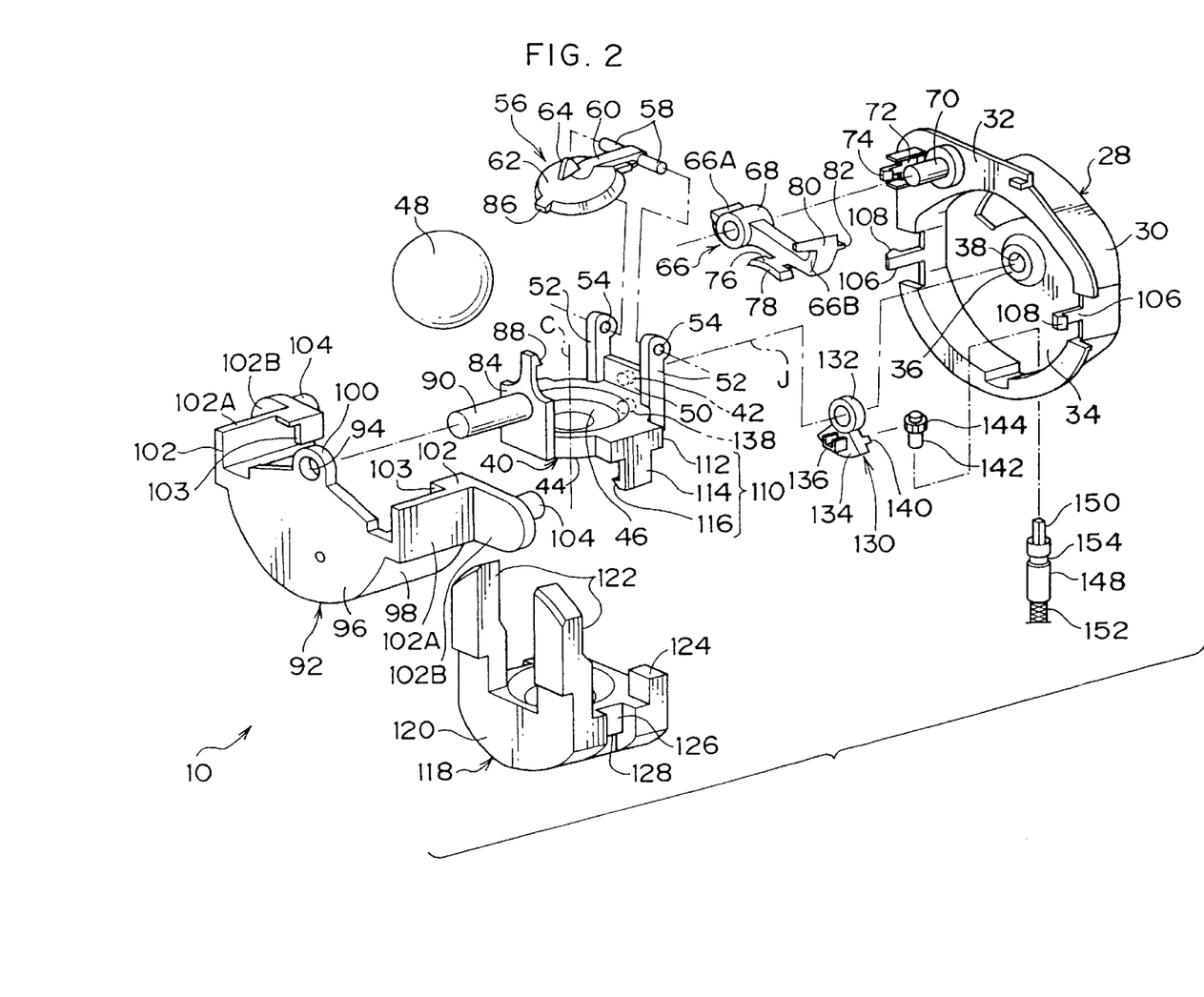
FIG. 2 is an exploded perspective view showing a portion of the acceleration sensor according to the embodiment of the present invention.

FIG. 1 shows an acceleration sensor 10 according to an embodiment of the present invention, which is in a state of being used as an acceleration sensor for a seat belt apparatus. FIG. 2 shows a primary portion of the acceleration sensor 10 in an enlarged view.

Figure 5:
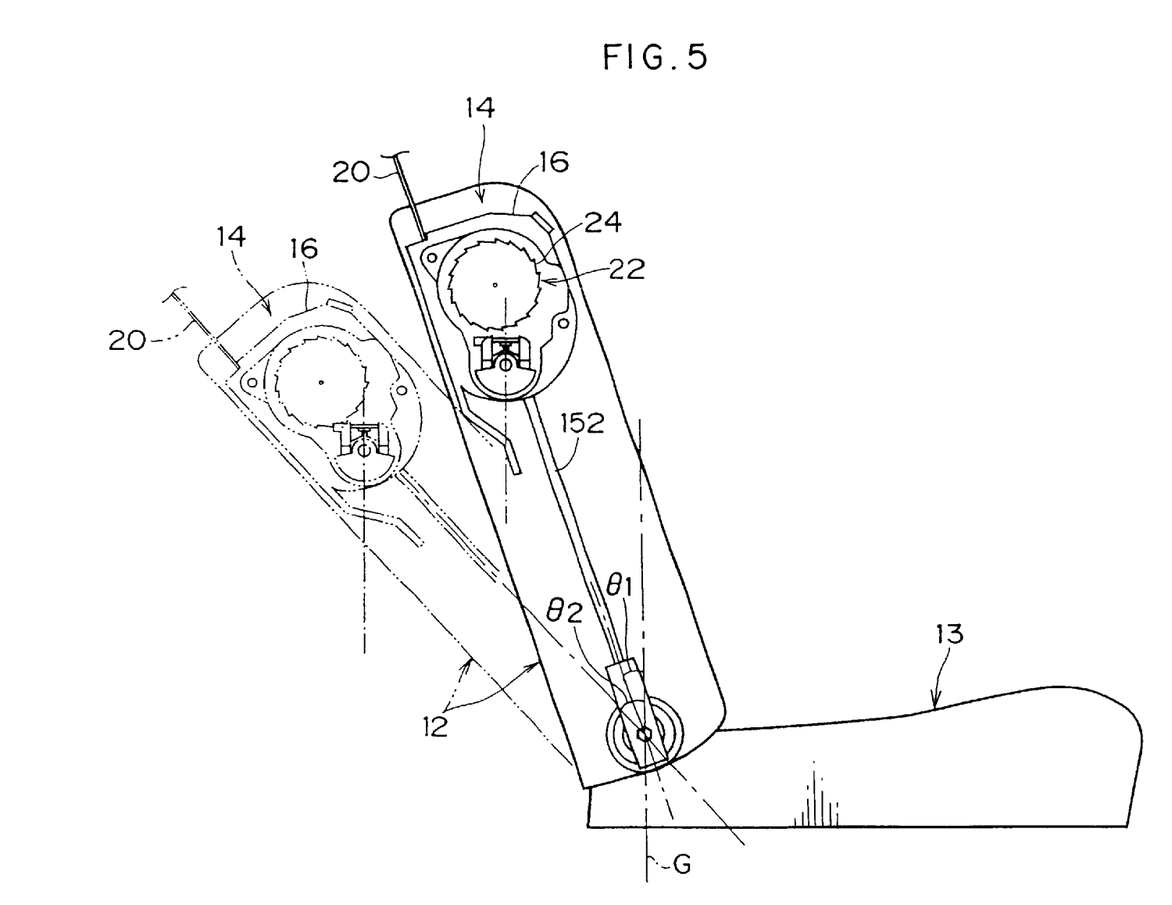
FIG. 5 is a side view showing a seat for vehicle in which the retractor to which the acceleration sensor according to the embodiment of the present invention is attached is employed.

As shown in FIG. 5, a retractor 14 for a seat belt apparatus is attached to a seatback 12 of a vehicle. As shown in FIG. 1, a spool shaft 18 is rotatably hung between and pivotally supported at a pair of parallel frame plates 16 that form the retractor 14 (in FIG. 1, only one frame plate 16 is illustrated; another frame plate 16 is unillustrated). A substantially cylindrical spool (not shown in the drawings) onto which a webbing 20 (see FIG. 5) is wound is mounted to the spool shaft 18.

One end of the spool shaft 18 protrudes from the frame plate 16, and a ratchet wheel 22 is attached to this protruding portion. The ratchet wheel 22, and the spool shaft 18 and the spool rotate integrally. An anchor pawl 80 of a pawl 66, which will be described later, engages with ratchet teeth 24 of the ratchet wheel 22, and the spool is thereby prevented, via the ratchet wheel 22 and the spool shaft 18, from rotating in a direction in which the webbing 20 is unwound (rotation in the direction of arrow A in FIGS. 3 and 4). However, when, in a state in which the anchor pawl 80 has engaged, the spool attempts to rotate in a webbing 20 retracting direction (the opposite direction to arrow A), the anchor pawl 80 rides up onto the ratchet teeth 24, and thus, the ratchet wheel 22 is not prevented from rotating. Accordingly, the spool can rotate in the webbing 20 retracting direction.

An attachment hole 26 is formed at a lower portion of the frame plate 16, and a sensor cover 28 is fitted into the attachment hole 26.

As shown in FIG. 2, the sensor cover 28 is in a substantially cylindrical shape having a bottom, and a cylindrical portion 30 thereof is formed in substantially the same shape as the attachment hole 26. A flange 32 is provided standing from a periphery of an opening of the cylindrical portion 30. The flange 32 abuts against the frame plate 16, and the sensor cover 28 is thereby positioned.

A pivotal support cylinder 36 is provided integrally with a bottom plate 34 of the sensor cover 28 so as to protrude from the center of the bottom plate 34 toward an opening side. An axial pin 42 of a bracket 40 is inserted into an axis hole 38 in the center of the pivotal support cylinder 36. The axial pin 42 forms a center of rotation of the bracket 40 (center line J).

The bracket 40 is made of synthetic resin, and has a supporting portion 44 which is in a flatness inverted cone shape (a center line of the supporting portion 44 is indicated by C). An upper surface of the supporting portion 44 is a supporting surface 46 which inclines downward from the outer periphery to the center, and a metal sensor ball 48 is disposed on and supported by the supporting surface 46. Generally in the supporting surface 46, the center line C is in a direction which coincides with a vertical line G (see FIG. 4). Consequently, the sensor ball 48 linearly contacts the supporting surface 46 along a circle shape around the center line C.

A shaft plate 50 protrudes upward from a sensor cover 28 side end portion of the supporting portion 44, and the above-mentioned axial pin 42 protrudes from the center of the shaft plate 50.

Axis posts 52 which are higher than the shaft plate 50 protrude from both sides of the shaft plate 50. Bearing holes 54 which pass through the axis posts 52 are formed in upper portions of the axis posts 52 in a transverse direction of the shaft plate 50. A support shaft 58 of a sensor lever 56 is inserted through the bearing holes 54.

The sensor lever 56 is formed integrally by an arm 60, which is extended perpendicularly to the support shaft 58 from the center thereof, and an inverted funnel-shaped saucer plate 62, which is formed in a substantially conical shape at a distal end of the arm 60. The saucer plate 62 is placed on an upper surface of the sensor ball 48.

Figure 8:
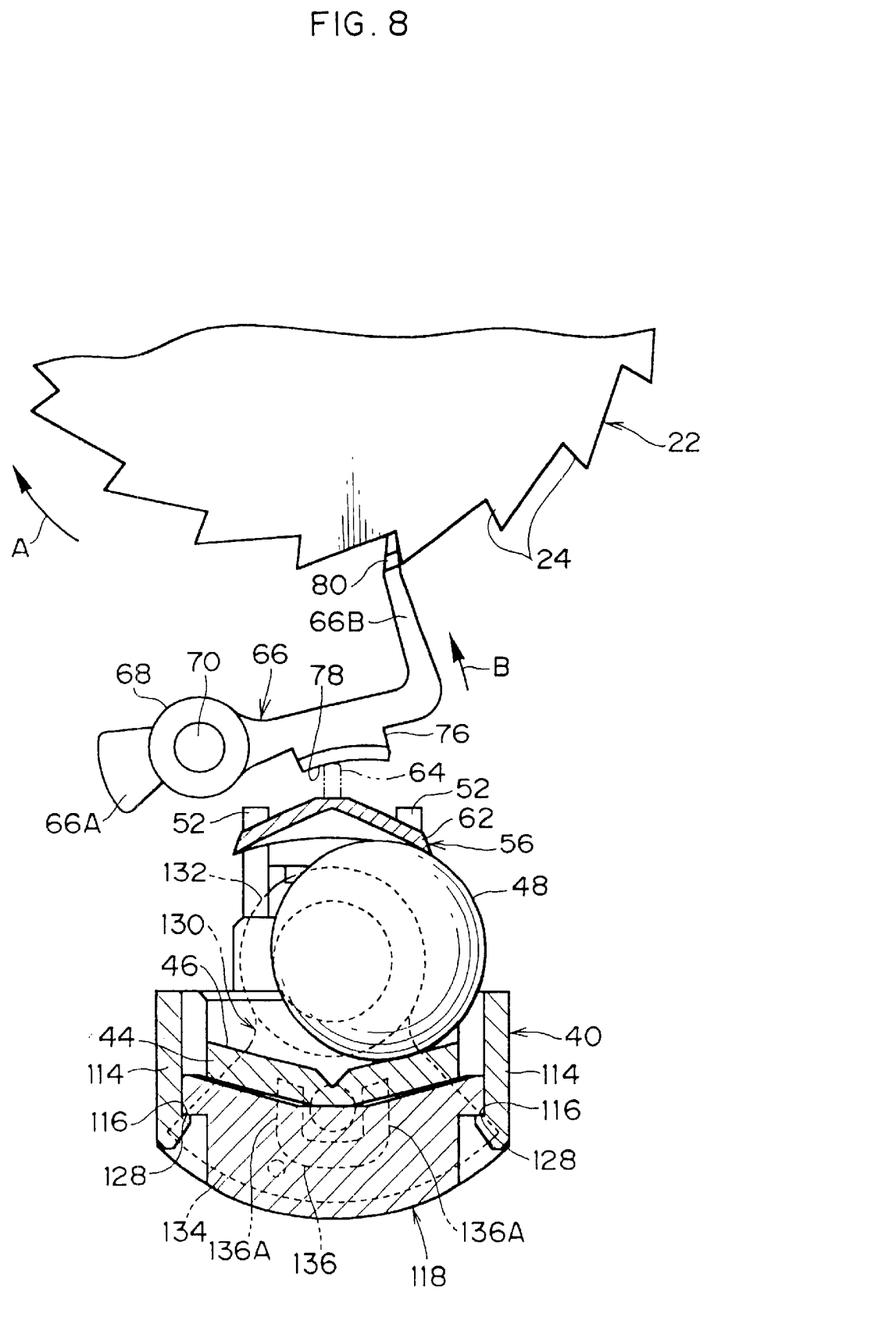
FIG. 8 is a schematic side view showing a state in which an anchor pawl of the acceleration sensor according to the embodiment of the present invention engages with the ratchet wheel of the retractor.

As shown in FIG. 8, when an acceleration at or above a predetermined value happens to the vehicle, the sensor ball 48 rolls on the supporting surface 46 due to inertia, moves in an upward direction of the supporting surface 46, and pushes the saucer plate 62 upward. As a result, the sensor lever 56 rotates about the support shaft 58 (see FIG. 2) in a direction in which the saucer plate 62 separates from the supporting surface 46 (upward).

An operating protrusion 64 that operates the pawl 66 protrudes from an upper surface of the saucer plate 62.

Figure 4:
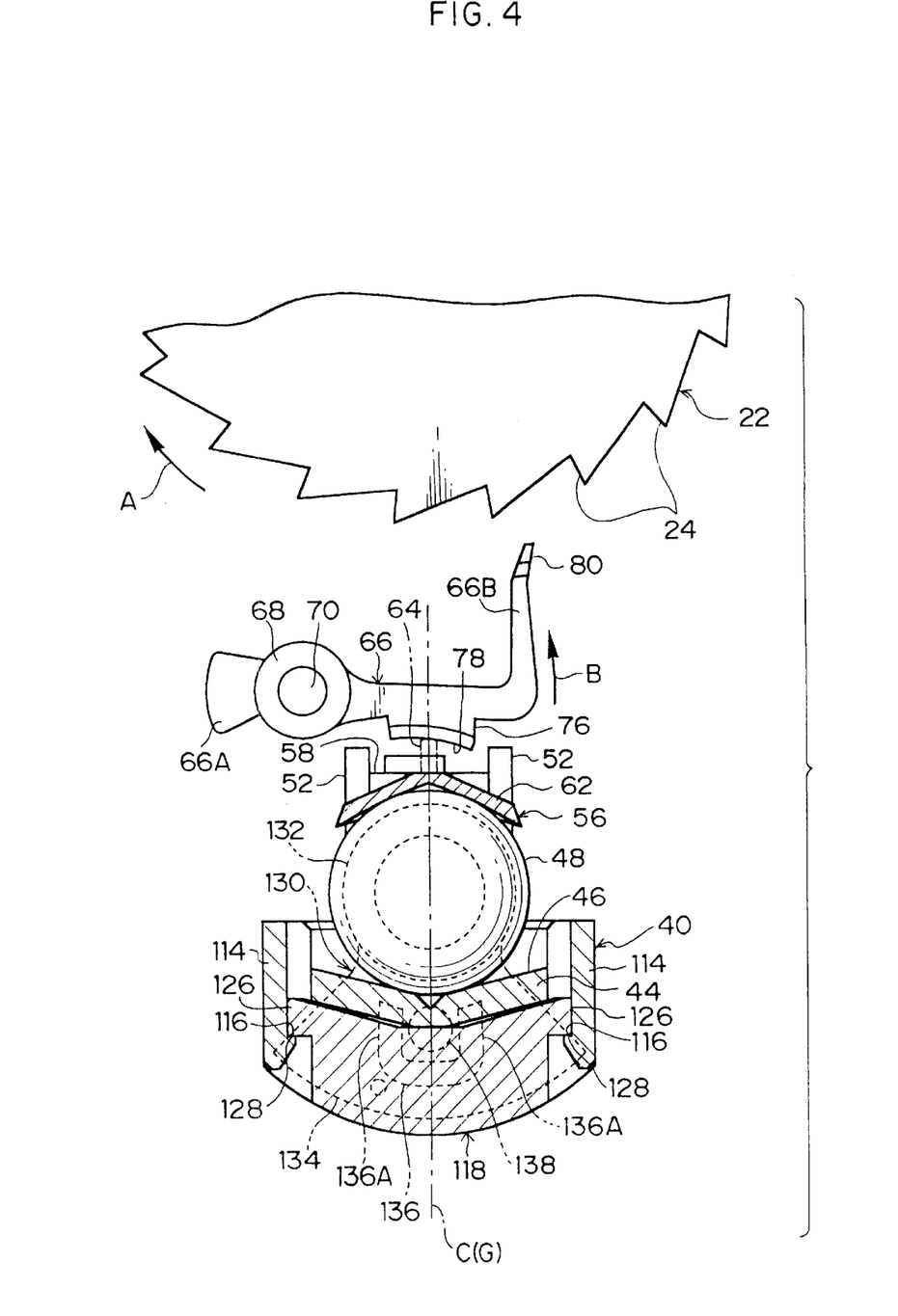
FIG. 4 is a schematic side view showing the acceleration sensor according to the embodiment of the present invention and a ratchet wheel of the retractor to which the acceleration sensor is attached.

As shown in FIGS. 2 and 4, the pawl 66 is formed in a substantial letter-L shape in side view, and a support shaft 70 that protrudes from the flange 32 of the sensor cover 28 is inserted into a cylindrical portion 68 formed near a distal end of a long arm portion 66A. Therefore, the pawl 66 is pivotally supported at the sensor cover 28 so as to be rotatable about the support shaft 70.

Figure 3:
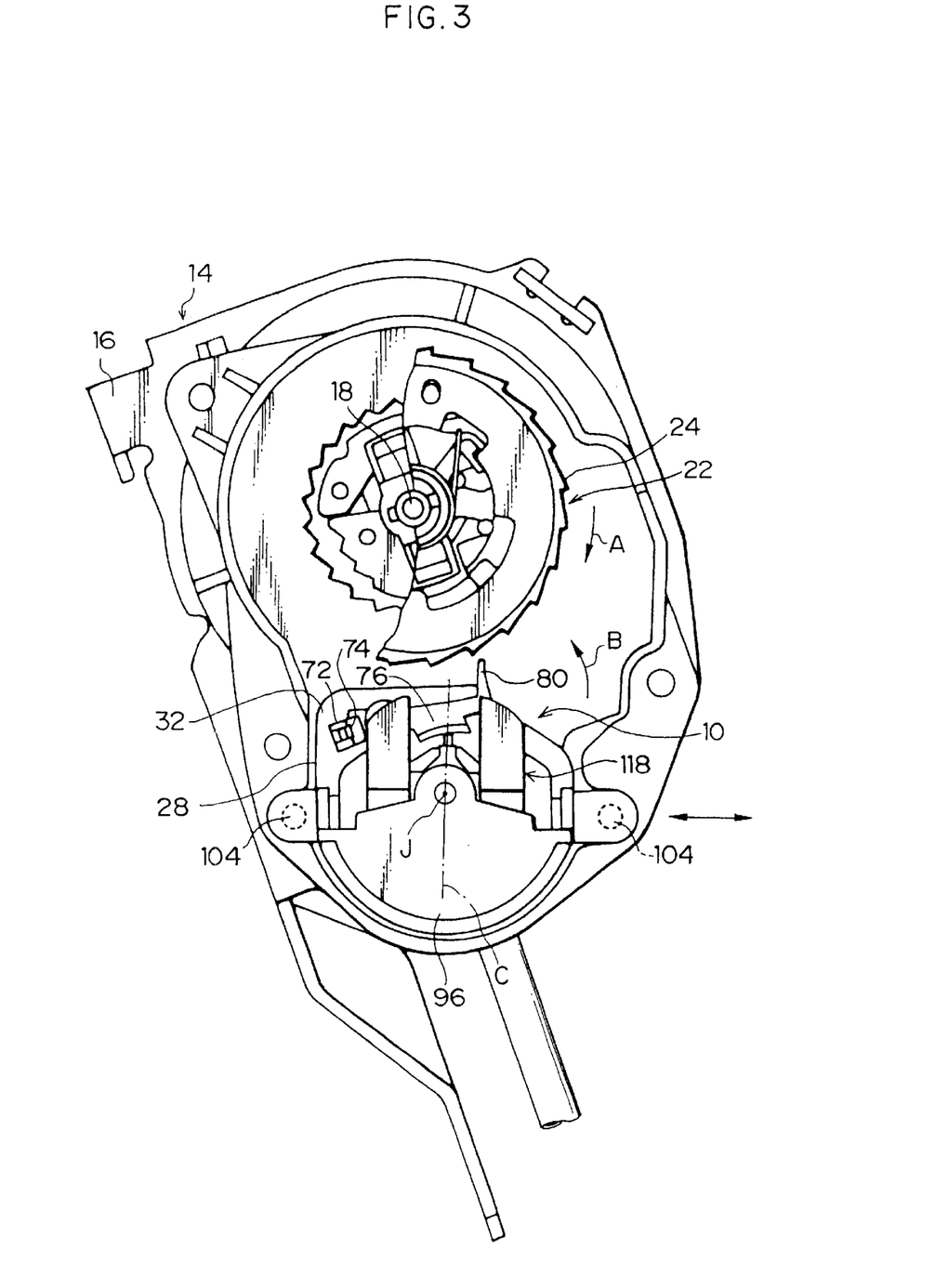
FIG. 3 is a partially cutaway side view showing the retractor to which the acceleration sensor according to the embodiment of the present invention is attached.

As shown in FIGS. 2 and 3, a limiting plate 72 protrudes from the flange 32, and a detachment prevention pawl 74 formed at a distal end of the limiting plate 72 engages with the distal end of the long arm portion 66A, prevents the pawl 66 from falling off the support shaft 70, and limits the rotation of the pawl 66 to a fixed range (the limiting plate 72 is not shown in FIG. 4).

A receiving member 76 is provided at a substantially central portion of the long arm portion 66A of the pawl 66 so as to protrude toward a side which is opposite to a side at which the sensor cover 28 is disposed. A lower surface of the receiving member 76 is a receiving surface 78 which is curved arcedly, and the receiving surface 78 abuts an upper end of the operating protrusion 64 of the sensor lever 56 due to the weight of the pawl 66.

As shown in FIG. 2, at a distal end of a short arm portion 66B of the pawl 66, the anchor pawl 80, which projects toward the receiving member 76 side and thins gradually toward the distal end of the short arm portion 66B, is formed. As shown in FIG. 8, when the pawl 66 rotates in a counterclockwise direction (the direction of arrow B), the anchor pawl 80 engages with the ratchet teeth 24 of the ratchet wheel 22, stops the pawl 66 rotating in the counterclockwise direction and prevents the ratchet wheel 22 from rotating in a clockwise direction of FIG. 8 (the direction of arrow A).

On the other hand, as shown in FIG. 4, when the pawl 66 rotates in a clockwise direction (the opposite direction to arrow B), the anchor pawl 80 separates from the ratchet teeth 24 of the ratchet wheel 22, and the ratchet wheel 22 can rotate in both of a clockwise direction of FIG. 4 (the direction of arrow A) and a counterclockwise direction.

A limiting protrusion 82 protrudes from a substantially central portion of the short arm portion 66B of the pawl 66 in a direction which is opposite to the direction of protrusion of the anchor pawl 80. The limiting protrusion 82 abuts against a side edge of the flange 32 so as to limit rotation of the pawl 66 in the clockwise direction of FIG. 4 (the opposite direction to arrow B).

At the bracket 40, a shaft plate 84 is provided standing at a position which opposes the shaft plate 50 with respect to the center line C of the supporting portion 44. The shaft plate 84 is formed so as to taper gradually from a vertical direction substantially central portion thereof toward an upper end thereof. A limiting pawl 88 is formed toward the shaft plate 50 at the upper end of the shaft plate 84. A limiting protrusion 86 formed at a distal end of the saucer plate 62 abuts against the limiting pawl 88, and rotation of the sensor lever 56 in a direction in which the saucer plate 62 approaches the supporting portion 44 is thereby limited.

A support shaft 90 protrudes coaxially with the axial pin 42 (i.e., along the axis line J) from a substantially central portion of the shaft plate 84 toward a side thereof which is opposite to the side thereof at which the shaft plate 50 is disposed. The support shaft 90 is inserted into a shaft hole 94 formed in a hanger 92. Accordingly, the axial pin 42 and the support shaft 90 are inserted into the axis hole 38 in the sensor cover 28 and the shaft hole 94 in the hanger 92 respectively. Thus, the bracket 40 can rotate around the axis line J.

The hanger 92 consists of a front surface plate portion 96, which is in a substantially sectoral shape in front view, and a peripheral plate portion 98, which has a substantially semi-tubular shape and extends perpendicularly from a periphery of the front surface plate portion 96. A ring-shaped ring portion 100 is formed at a center point of the front surface plate portion 96, and a central hole in the ring portion 100 is the axis hole 94. A space surrounded by the front surface plate portion 96 and the peripheral plate portion 98 is a containing space in which the bracket 40 is contained.

A pair of attachment plates 102 formed in substantial letter-L shapes are formed at both ends of the peripheral plate portion 98. Long arm portions 102A of the attachment plates 102 are integrally continuous with the peripheral plate portion 98, and face each other in parallel.

Short arm portions 102B of the attachment plates 102 extend from a side which is opposite to the side at which the front surface plate portion 96 is disposed toward directions such that the short arm portions 102B extend away from each other. A fixing pin 104 protrudes from a substantially central portion of the short arm portion 102B in a direction opposite a direction in which the long arm portion 102A extends from the short arm portion. Further, an anchor step portion 103 is formed at each of facing surfaces of the long arm portions 102A. The anchor step portions 103 anchor to mooring portions 108 of protruding pieces 106 which protrude from the sensor cover 28, and the hanger 92 is thereby attached to the sensor cover 28.

A weight mounting portion 110 is integrally provided at each of end portions of the bracket 40 in a diametric direction which is orthogonal to the axis line J (in FIG. 2, only one weight mounting portion 110 is illustrated; another weight mounting portion 110 is unillustrated). Each weight mounting portion 110 is formed such that a rectangular based base portion 112 integrally protrudes from a side portion of the supporting portion 44, and a tongue piece-shaped mounting piece 114 integrally protrudes downward from a central portion of an outer lower side of the base portion 112. Further, a mounting protrusion 116 which protrudes inside in a hook shape is integrally formed at a distal end of the mounting piece 114.

A metal weight 118 is integrally assembled to the weight mounting portions 110. The weight 118 is integrally formed by a base table portion 120, which is formed in a substantially semi-cylindrical shape, a pair of horn pieces 122, which are provided substantially in parallel standing upward from an end portion of one side surface of the base table portion 120, and small prism-shaped supporting posts 124, which are provided standing from both corner portions of another side surface of the base table portion 120. At positions between the horn pieces 122 and the supporting posts 124, a pair of mounting grooves 126 are formed by portions cut out of the base table portion 120 in rectangular groove shapes to correspond with the mounting pieces 114 of the bracket 40. At lower ends of the mounting grooves 126, mounting step portions 128 are formed by further cutting into the mounting grooves 126 in mutually approaching directions to correspond with the mounting protrusions 116. When the mounting pieces 114 are fitted into the mounting grooves 126, and the mounting protrusions 116 are engaged with the mounting step portions 128, the weight 118 is attached to the bracket 40.

Shapes of the bracket 40 and the weight 118 are determined such that a center of gravity of the weight 118 is positioned below a center of rotation of the bracket 40 (axis line J) and is positioned on the center line C of the supporting portion 44. Therefore, as shown in FIG. 4, the bracket 40 rotates about the axial pin 42 and the support shaft 90 due to the dead load of the weight 118 and the center line C is aligned with the vertical line G.

A face wheel 130 is pivotally supported at a substantially intermediate portion in a longitudinal direction of the support shaft 42 (a portion that is not a distal end portion inserted into the axis hole 38).

Figure 6:
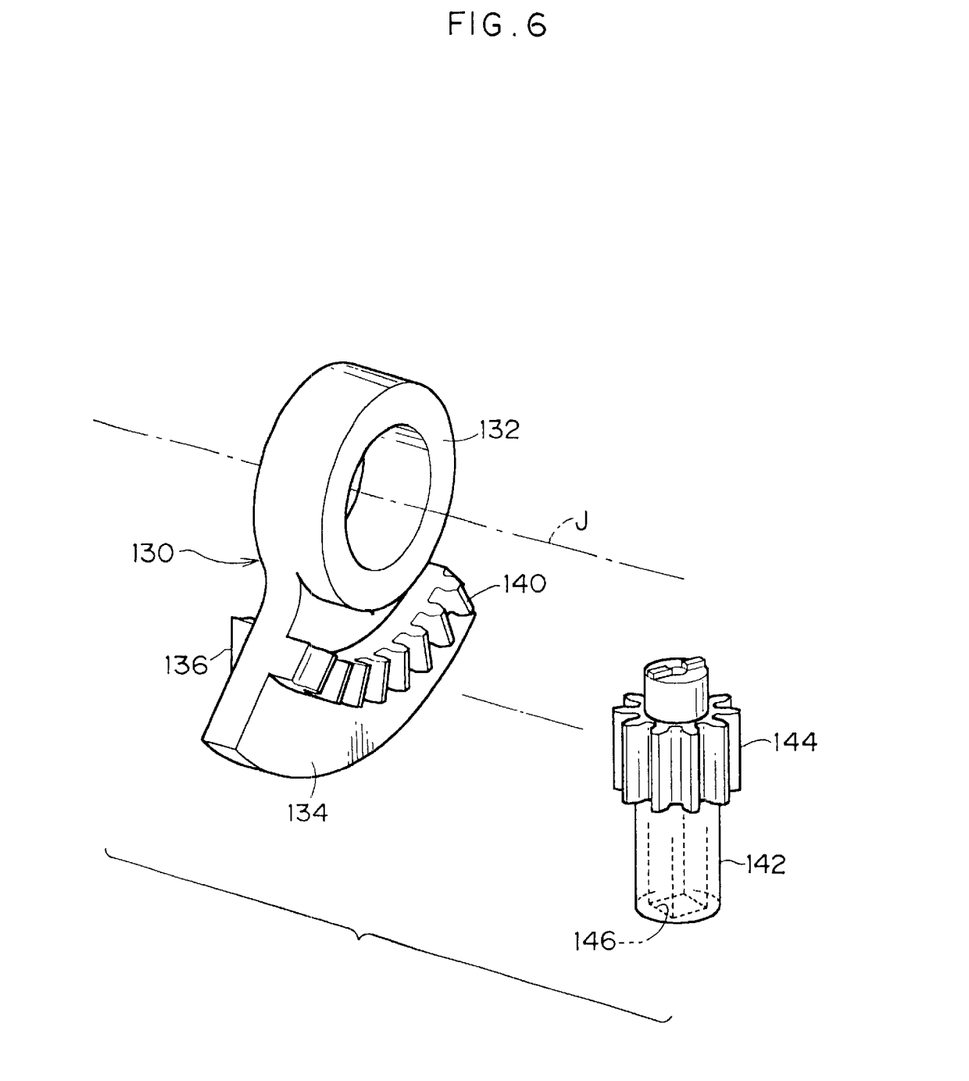
FIG. 6 is a perspective view showing a face wheel and a rotating cylindrical body of the acceleration sensor according to the embodiment of the present invention.

As shown in FIG. 6, the face wheel 130 has a mounting cylindrical portion 132, which has a cylindrical shape and is mounted on the support shaft 42, and a sectoral portion 134, which is sectorally extended from a portion of an external periphery of the mounting cylindrical portion 132. A center line of the face wheel 130 in side view is indicated by C1.

A limiting protrusion 136, which has a substantial letter-U shape in side view, is provided standing from a surface of the sectoral portion 134 that faces the bracket 40. Correspondingly, a limiting shaft 138, which is accommodated in the limiting protrusion 136, protrudes from a surface of the bracket 40 which surface faces the sectoral portion 134. Predetermined clearances 198 are formed between side walls 136A of the limiting protrusion 136 and the limiting shaft 138 (in the present embodiment, the clearances correspond to central angles of two degrees each about the axis line J). When the bracket 40 rotates, the clearance 198 is eliminated such that the limiting shaft 138 abuts against the side wall 136A of the limiting protrusion 136, and rotation of the bracket 40 is thereby limited to within a predetermined range.

At a surface of the sectoral portion 134 which is opposite to the surface thereof at which the limiting protrusion 136 is provided, an arced gear 140 is formed as a portion of a crown gear whose center is the axis line J (in other words, as a rack which is formed so as to curve arcedly around the axis line J). A small gear 144 formed at a rotating cylindrical body 142 meshes with the arced gear 140.

The rotating cylindrical body 142 is formed in a substantially circular tube shape having a base plate only at an upper end thereof, and a square insertion hole 146 is formed at a lower end side of the rotating cylindrical body 142.

The insertion hole 146 is formed in a square shape, and a square pin 150 shown in FIGS. 1 and 2, which has a square post shape and protrudes from a connector 148, is inserted into the insertion hole 146 without clearance. Therefore, when the connector 148 rotates, the rotating cylindrical body 142 also rotates integrally, and the face wheel 130, which meshes with the small gear 144 of the rotating cylindrical body 142, rotates around the axis line J.

The connector 148 is formed in a substantially cylindrical shape. An upper end portion of a wire 152 is inserted into an opening at a lower end of the connector 148. A central portion of the connector 148 is crimped so as to form a reduced diameter portion 154. The wire 152 is compressed from the periphery thereof by the reduced diameter portion 154 so as to be integrated with the connector 148.

Figure 7:
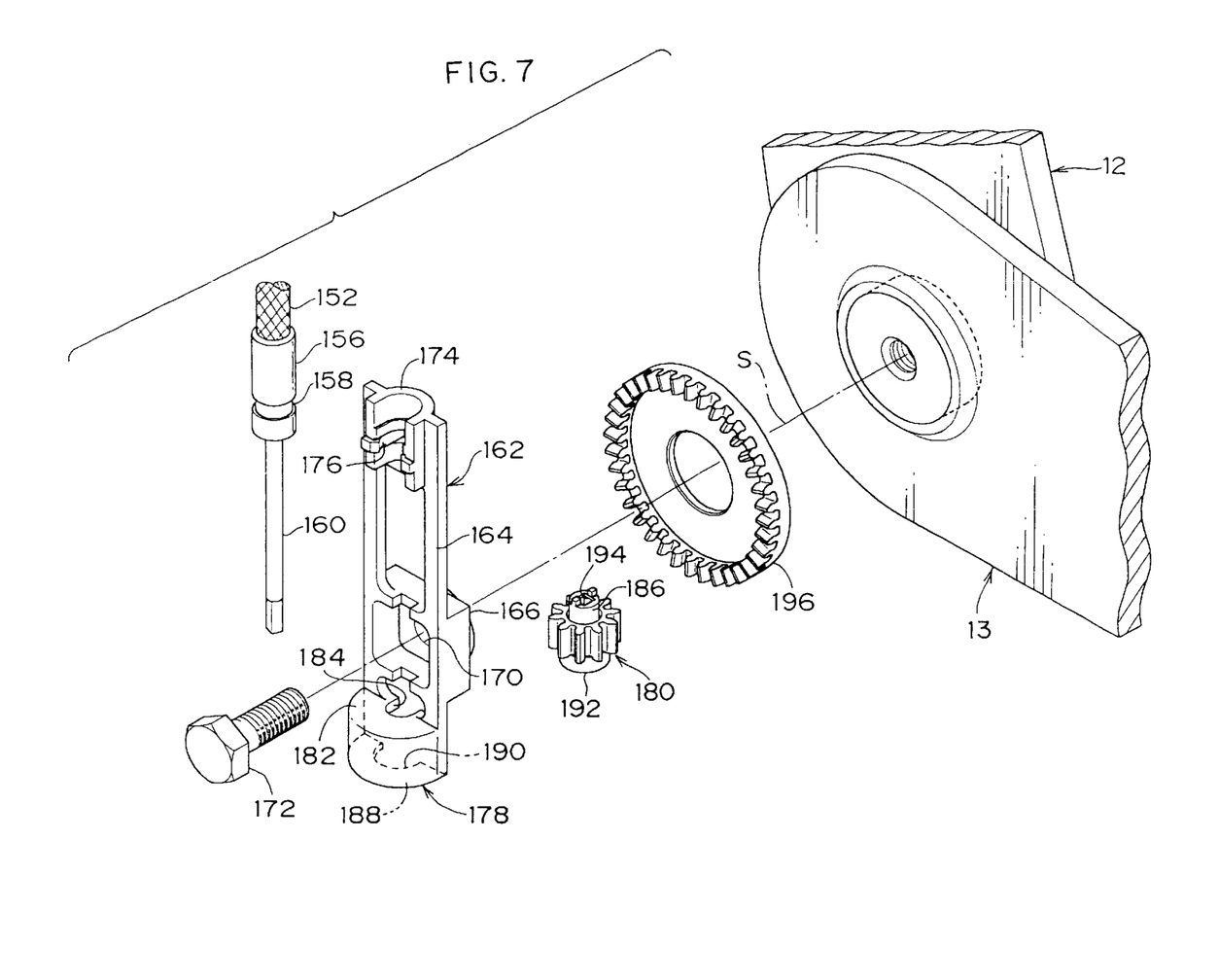
FIG. 7 is an exploded perspective view showing a vicinity of a center of inclination of the seat for vehicle in which the retractor to which the acceleration sensor according to the embodiment of the present invention is attached is employed.

As shown in FIG. 7, a connector 156 is attached to a lower end of the wire 152. A substantially central portion in the vertical direction of the connector 156 is crimped so as to form a reduced diameter portion 158, and the wire 152 is compressed from the periphery thereof by the reduced diameter portion 158 so as to be integrated with the connector 156.

A pin 160 protrudes downward from the connector 156. A distal end of the pin 160 is formed in the same square post shape as the square pin 150.

The connector 156 is fitted into a holder 162. The holder 162 has a plate portion 164, which is formed in a flat plate shape, and an attachment recess portion 166, which bulges in a square frame shape from the plate portion 164 toward a back surface side thereof, and at a center of which a screw hole 170 is formed. A screw 172 is inserted through the screw hole 170, and the holder 162 is thereby attached to the seatback 12. The center of the screw 172 is coincident with a center of inclination of the seatback 12. Therefore, when the seatback 12 inclines, the holder 162 pivots about the screw 172 at the same angle as an angle of inclination of the seatback 12.

The connector 156 is contained in and supported by a holder containing portion 174, which is in a substantially semi-tubular shape and is formed at an upper end of the plate portion 164 of the holder 162. At a substantially central portion of the holder containing portion 174, an inner surface of the holder containing portion 174 bulges inside along part of the circumferential direction so as to form an engaging portion 176. The engaging portion 176 engages with the reduced diameter portion 158 of the connector 148 without clearance, and the connector 156 is thereby positioned relative to the holder 162 in the longitudinal direction thereof.

A gear containing portion 178 is formed at a lower end of the holder 162. The gear containing portion 178 is formed in a semi-tubular shape having a base, and a driving gear 180 is contained inside the gear containing portion 178. An upper shaft body 186 of the driving gear 180 is fitted into a semi-circular shaft hole 184 formed at an upper plate 182 of the gear containing portion 178 and, similarly, a lower shaft body 192 of the driving gear 180 is fitted into a semi-circular shaft hole 190 formed at a lower plate 188 of the gear containing portion 178. Thus, the driving gear 180 is rotatably pivotally supported in the gear containing portion 178.

A square insertion hole 194 corresponding to the shape of the distal end of the pin 160 is formed at the upper shaft body 186 of the driving gear 180. The distal end of the pin 160 is inserted into the insertion hole 194 without clearance. Therefore, rotation of the driving gear 180 transmits to the wire 152 via the pin 160 and the connector 148, and the wire 152 thereby rotates.

The driving gear 180 meshes with a crown gear 196 fixed at a seat cushion 13. A center of the crown gear 196 is coincident with a rotation center S of the seatback 12. Therefore, when the seatback 12 is inclined, the holder 162 rotates around the rotation center S together with the seatback 12. Accordingly, while the driving gear 180 contained in the gear containing portion 178 of the holder 162 revolves around the rotation center S, the driving gear 180 rotates (turns) due to meshing with the crown gear 196.

The wire 152 rotates due to the rotation of the driving gear 180, and the small gear 144 thereby rotates. The face wheel 130 rotates around the axis line J due to the arced gear 140 meshing with the small gear 144. Numbers of teeth and diameters of the arced gear 140, the small gear 144, the driving gear 180 and the crown gear 196 are respectively set to predetermined values so that an angle of inclination of the seatback 12 is equal to an angle of rotation of the face wheel 130.

An outer cover 198 is attached to the frame plate 16. The ratchet wheel 22 is contained between the outer cover 198 and the frame plate 16. The rotating cylindrical body 142, the face wheel 130, the pawl 66, the sensor lever 56, the bracket 40, the sensor ball 48, the weight 118 and the hanger 92 are disposed between the outer cover 198 and the sensor cover 28.

Next, operation and action of the acceleration sensor 10 according to the present embodiment will be described.

Figure 9:
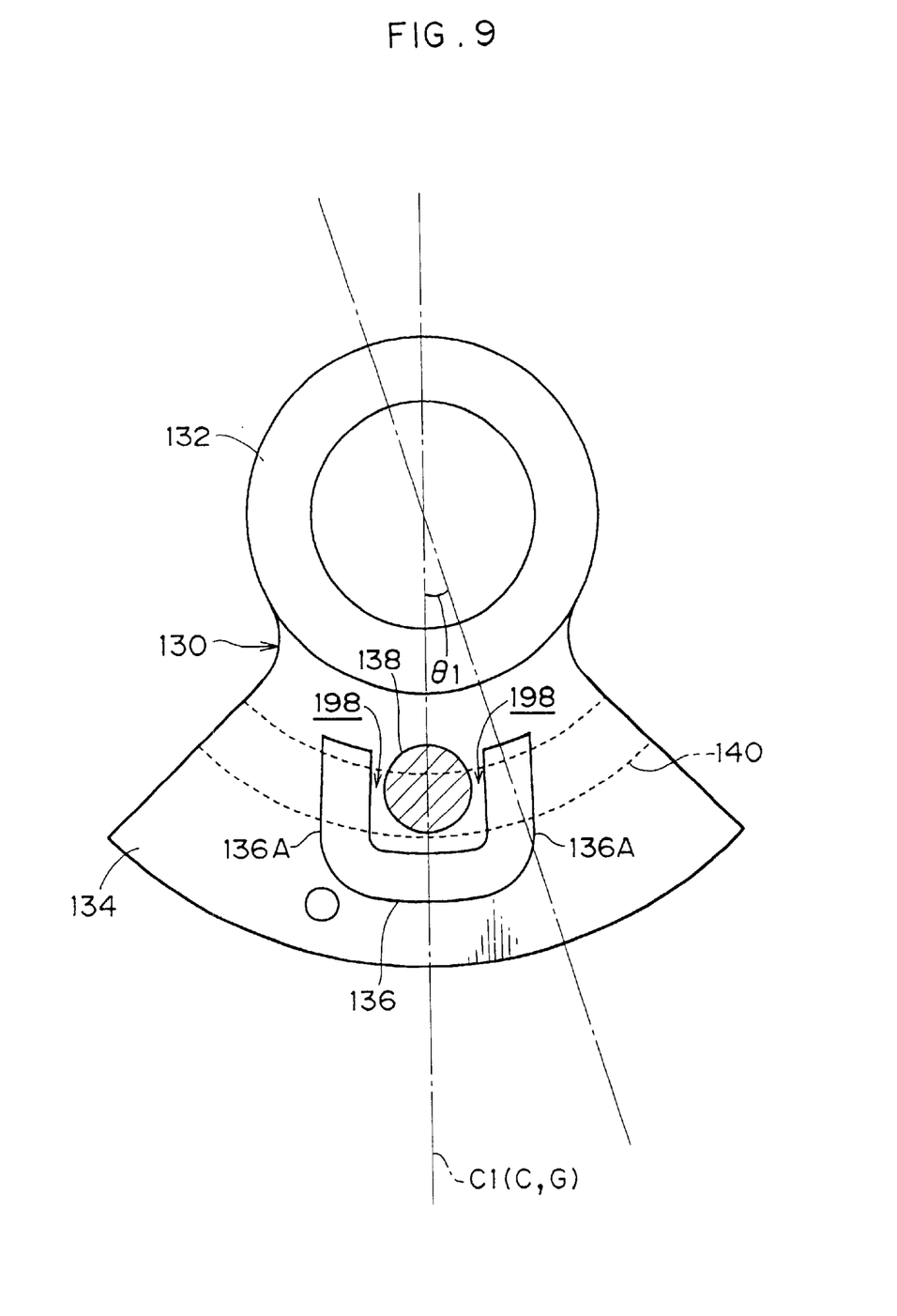
FIG. 9 is a schematic side view showing a relationship between the face wheel and a limiting shaft of the acceleration sensor according to the embodiment of the present invention.
Figure 10:
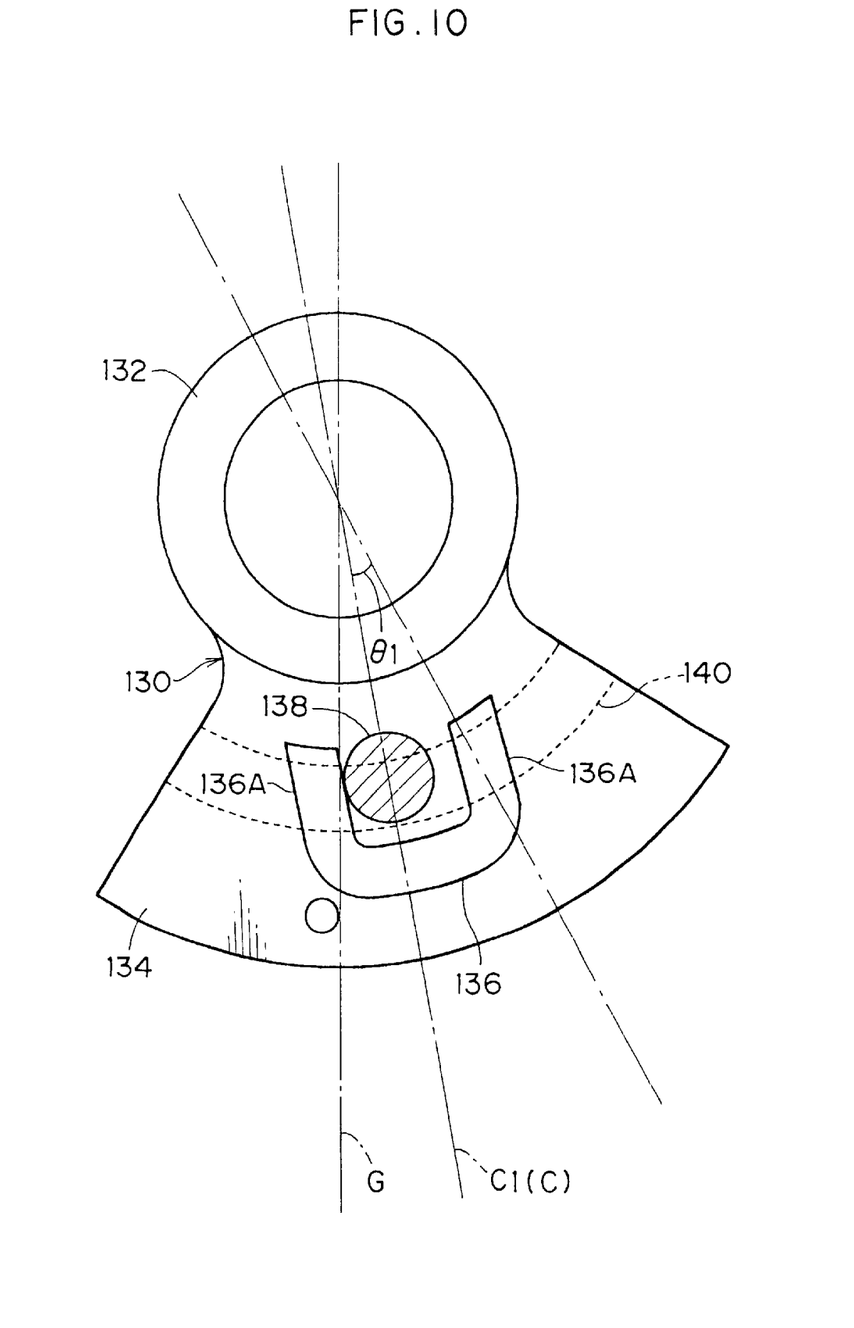
FIG. 10 is a schematic side view showing a relationship between the face wheel and the limiting shaft of the acceleration sensor in a state in which a vehicle is inclined.

When the seatback 12 to which the retractor 14 is attached is in a state shown with solid lines in FIG. 5 (a state of inclination at a predetermined reclining angle θ1 with respect to the vertical line G), the center line C1 of the face wheel 130 is in the same direction as the vertical line G, as shown in FIG. 9, and the limiting protrusion 136 is symmetrical in side view.

At this time, as shown in FIG. 4, the bracket 40 is rotatably urged by rotating force due to the dead load of the weight 118 so that the center line of the bracket 40 is in the same direction as the vertical line G. Because the limiting protrusion 136 is laterally symmetrical in side view, the limiting shaft 138 is positioned midway between the pair of side walls 136A of the limiting protrusion 136. There will not happen that the limiting shaft 138 is pushed against the side wall 136A of the limiting protrusion 136 by the rotating force due to the dead load of the weight 118.

In a normal state, the sensor ball 48 is positioned at a center of the supporting surface 46, and does not push the saucer plate 62 upward (in the direction in which the saucer plate 62 separates from the supporting surface 46). Because the sensor lever 56 does not rotate, the pawl 66 does not rotate in the counterclockwise direction in FIG. 4 (the direction of arrow B). Accordingly, the anchor pawl 80 of the pawl 66 does not engage with the ratchet teeth 24, and the unillustrated spool can rotate both in the webbing 20 retracting direction (the direction of arrow A in FIG. 3) and in the direction in which the webbing 20 is unwound (the opposite direction to arrow A).

When an acceleration in a horizontal direction is applied to the acceleration sensor 10, the sensor ball 48 inertially moves up on the supporting surface 46. However, if the acceleration is less than the predetermined value, angles of rotation of the sensor lever 56 and the pawl 66 are small, and the anchor pawl 80 of the pawl 66 does not engage with the ratchet teeth 24.

If the acceleration is at or above the predetermined value, the sensor ball 48 moves inertially on the supporting surface 46, reaches an upper portion of the supporting surface 46, as shown in FIG. 8, and pushes the saucer plate 62 upward. The sensor lever 56 rotates and the operating protrusion 64 pushes the receiving surface 78 of the pawl 66 upward. Thus, the pawl 66 rotates in the counterclockwise direction of FIG. 8 (the direction of arrow B). Accordingly, the anchor pawl 80 engages with the ratchet teeth 24, and the spool is prevented from rotating in the direction in which the webbing 20 is unwound.

When the angle of inclination of the seatback 12 is the abovementioned angle θ1, if the vehicle itself inclines in a pitching direction, the bracket 40 rotates around the axis line J due to the dead load of the weight 118, and attempts to rotate in a direction such that the center line C of the bracket 40 aligns with the vertical line G. However, the face wheel 130 inclines in the pitching direction integrally with the vehicle body. Therefore, one of the clearances 198 formed between the limiting shaft 138 and the side walls 136A of the limiting protrusion 136 is eliminated (and another clearance 198 is widened). As a result, the limiting shaft 138 is pushed against the side wall 136A of the limiting protrusion 136, and the bracket 40 inclines with respect to the vehicle body. Consequently, the sensor ball 48 moves on the supporting surface 46, and pushes the saucer plate 62 upward. The sensor lever 56 and the pawl 66 rotate, and the anchor pawl 80 engages with the ratchet teeth 24.

In this way, the limiting shaft 138 is pushed by the side wall 136A of the limiting protrusion 136, and the bracket 40 is thereby inclined together with the vehicle body. Thus, even a small angle of inclination can reliably lock the rotation of the spool in the direction in which the webbing 20 is unwound. Namely, as compared with conventional automatic follow-up type sensor devices, a so-called tilt lock angle is small.

As shown by the two dotted lines in FIG. 5, when the seatback is inclined so as to have a reclining angle θ2 while in a state in which an acceleration at or above the predetermined value is not applied to the vehicle, the holder 162 fixed to the seatback 12 rotates through an angle (θ2-θ1) relative to the crown gear 196 fixed to the seat cushion 13. Accordingly, the driving gear 180 meshing with the crown gear 196 rotates by the same angle, the wire 152 rotates, and the small gear 144 attached to the upper end of the wire 152 also rotates.

Figure 11:
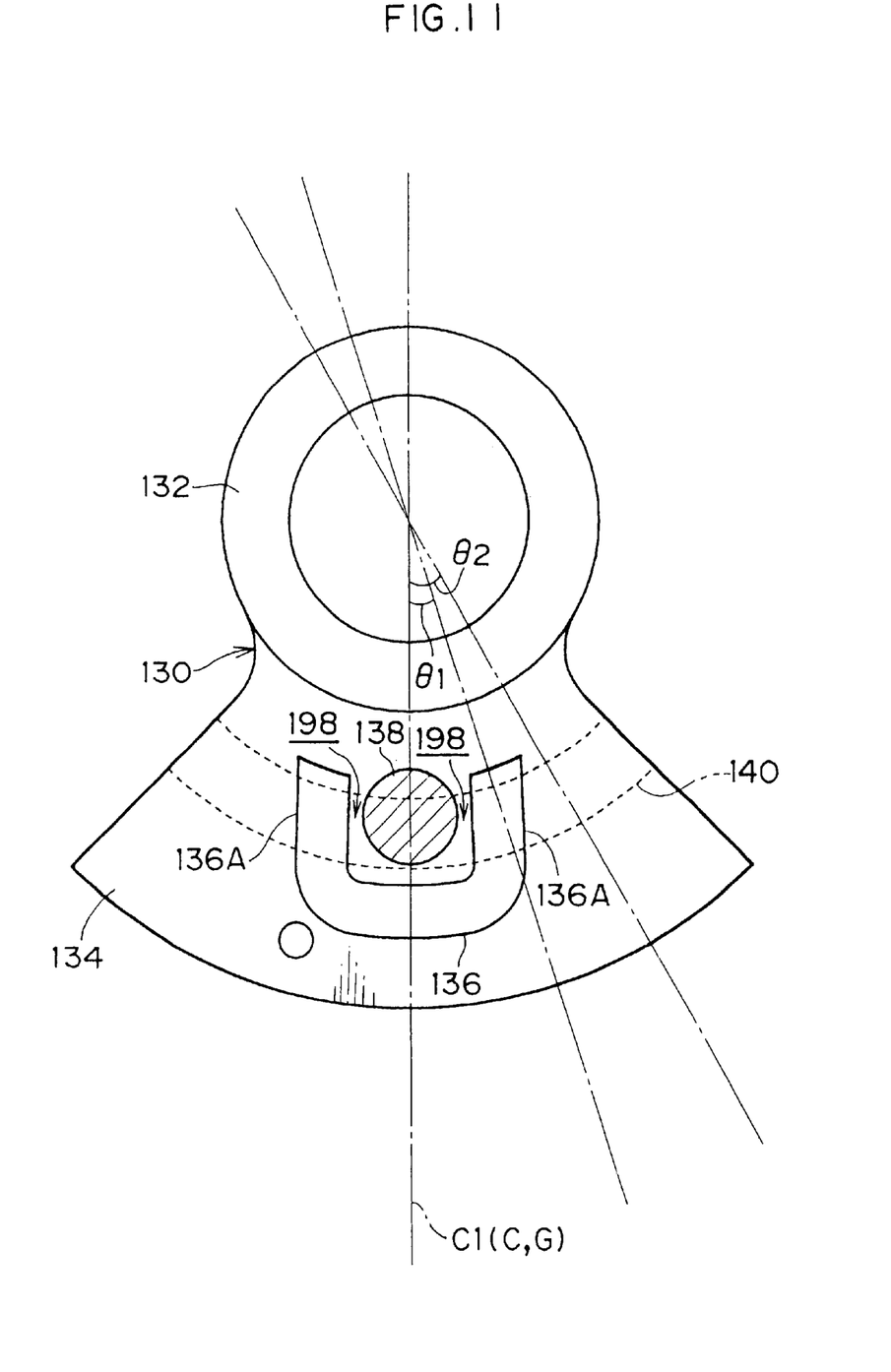
FIG. 11 is a schematic side view showing a relationship between the face wheel and the limiting shaft of the acceleration sensor in a state in which a seatback of the vehicle is further reclined from the state shown in FIG. 9.

When the small gear 144 rotates, the face wheel 130 rotates around the axis line J due to the meshing between the small gear. 144 and the arced gear 140. An angle of rotation of the face wheel 130 is adjusted so as to be equal to the angle of inclination of the seatback 12. Thus, as shown in FIG. 11, the center line C1 of the face wheel 130 always aligns with the vertical line G, regardless of the angle of inclination of the seatback 12.

As a result, as shown in FIG. 4, while maintaining the state in which the limiting shaft 138 is positioned midway between the side walls 136A of the limiting protrusion 136, the bracket 40 rotates relative to the seatback 12 due to the dead load of the weight 118, and the center line C of the bracket 40 is kept in the vertical direction (however, regarding the bracket 40 itself, the bracket 40 does not rotate relative to the vertical line G).

Figure 12:
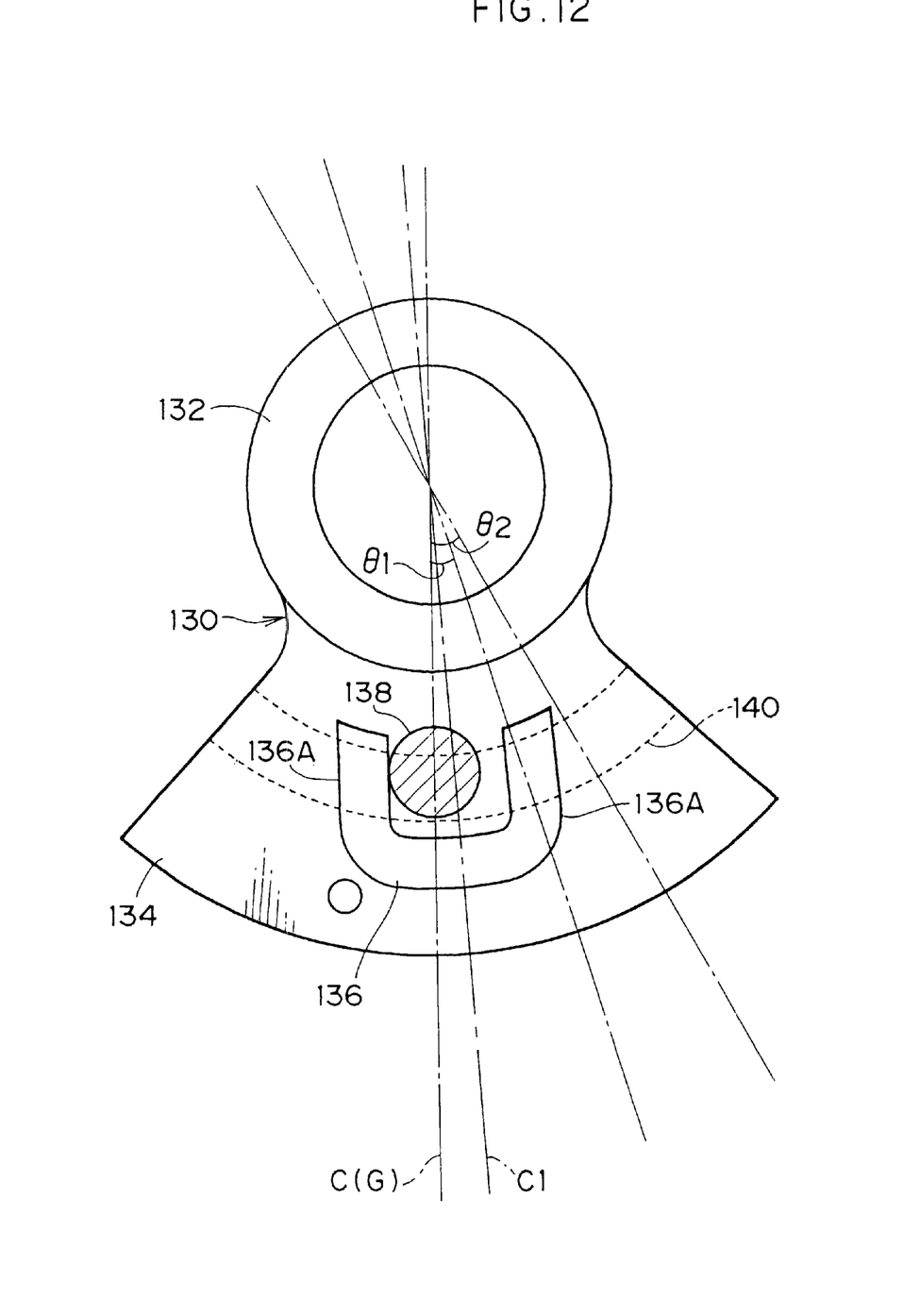
FIG. 12 is a schematic side view showing a relationship between the face wheel and the limiting shaft of the acceleration sensor in a state in which the seatback of the vehicle is further reclined from the state shown in FIG. 9 and only the face wheel rotates.

A difference may be caused between the angle of inclination of the seatback 12 and the angle of rotation of the face wheel 130 by, for example, a twist in the wire 152, a meshing error between the crown gear 196 and the driving gear 180, looseness of attachment at the face wheel 130 and the like. However, even in this case, because the predetermined clearances 198 are formed between the limiting shaft 138 and the side walls 136A of the limiting protrusion 136, rotation of the bracket 40 alone is allowed within the range of the clearances 198. Namely, as shown in FIG. 12, due to the clearances 198, the bracket 40 rotates independently of the face wheel 130 within the predetermined range (in the present embodiment, within a range of angles of rotation of two degrees) due to the dead load of the weight 118. Therefore, even if there is a difference between the angle of inclination of the seatback 12 and the angle of rotation of the face wheel 130, the center line C of the bracket 40 always aligns with the vertical line G.

In a case of a conventional automatic follow-up type sensor device, immediately after the seatback 12 is inclined, the bracket 40 may swing around the axis line J in the manner of a pendulum due to the dead load of the weight 118. However, in the acceleration sensor 10 of the present embodiment, the limiting shaft 138 abuts against the side walls 136A of the limiting protrusion 136, and swinging of the bracket 40 is thereby limited.

When an acceleration at or above the predetermined value is applied to the bracket 40 in this state, the sensor ball 48 inertially moves on the supporting surface 46 so as to reach an upper portion of the supporting surface 46, and pushes the saucer plate 62 upward. The sensor lever 56 and the pawl 66 rotate, the anchor pawl 80 engages with the ratchet teeth 24, and the spool is prevented from rotating in the direction in which the webbing 20 is unwound (the direction of arrow A in FIG. 3).

Further, in a case in which the vehicle body is rotated in the pitching direction, one of the clearances 198 formed between the limiting shaft 138 and the side walls 136A of the limiting protrusion 136 is eliminated, the limiting shaft 138 is pushed by the side wall 136A of the limiting protrusion 136, and the weight 118 inclines with respect to the vehicle body. The sensor ball 48 moves up on the supporting surface 46, and pushes the saucer plate 62 upward. Consequently, the sensor lever 56 and the pawl 66 rotate, and the anchor pawl 80 engages with the ratchet teeth 24.

In the above descriptions, a case in which the limiting protrusion 136 is formed at the face wheel 130 as a first abutting body, and the limiting shaft 138 is formed at the bracket 40 as a second abutting body is described. However, the first abutting body and the second abutting body are not limited to these. In other words, the abutting bodies may be any members which form predetermined clearances between a portion of the face wheel 130 and a portion of the bracket 40 such that the bracket 40 can rotate independently of the face wheel 130 due to the dead load of the weight 118. For example, the limiting protrusion 136 and the limiting shaft 138 could be exchanged, such that the limiting shaft 138 is formed at the face wheel 130 as the first abutting body, and the limiting protrusion 136 is formed at the bracket 40 as the second abutting body. Further, the shapes of the first abutting body and the second abutting body are not limited to the shapes above-described.

Moreover, a moving body is not limited to the above-described sensor ball 48. The moving body may be any member that inertially moves when an acceleration at or above the predetermined value is applied to the bracket 40 and that drives an output member (the sensor lever 56 in the present embodiment). For example, in a case in which it is sufficient that acceleration only in a longitudinal direction of the vehicle is sensed, a cylindrical member which is supported so that a center axis thereof is in a direction orthogonal to the longitudinal direction of the vehicle (i.e., the member can inertially move only in the longitudinal direction of the vehicle), or a member whose center of gravity inertially moves due to an acceleration at or above the predetermined value such that the member falls on the supporting surface 46, is sufficient. Further, as well as a member supported on the supporting surface 46 so as to inertially move on the supporting surface 46, a member, for example, which is pendulously suspended from the supporting body so as to inertially move due to an acceleration at or above a value and drive the output member, is satisfactory.

Furthermore, material of the moving body is not limited to metal, and may be any general material such as synthetic resin having a fixed mass. Additionally, a structure in which the sensor ball 48, upon inertially moving on the supporting surface 46, directly pushes and rotates the pawl 66 upward such that the anchor pawl 80 engages with the ratchet teeth 24 of the ratchet wheel 22, and the sensor lever 56 is omitted, is also possible.

Further, in the above descriptions, a case in which the acceleration sensor 10 is attached to the retractor 14 and the retractor 14 is disposed at the seatback 12 of the vehicle is described. However, the position and the member at which the acceleration sensor 10 is used is, of course, not limited thus.

What is claimed is:

1. An acceleration sensor comprising:

a supporting body attached to an inclinable inclining member, which said supporting body can rotate at least around an axis that is parallel to a center of rotation of the inclining member;

a moving body supported to said supporting body, which moving body inertially moves due to an acceleration at or above a predetermined value applied to said supporting body, and drives an output member;

a mass body, which, by a weight of said mass body, applies torque to said supporting body to a direction such that said supporting body has a predetermined angle with respect to a horizontal plane; and a rotating mechanism, which followingly moves in accordance with an inclination of the inclining member, and enables said supporting body to be independently rotated within a predetermined range by the torque from said mass body such that said supporting body has the predetermined angle with respect to the horizontal plane, said rotating mechanism including
   a wheel, which can rotate coaxially with said supporting body, and which rotates in accordance with an angle of inclination of the inclining member,
   a first abutting body provided so as to protrude from said wheel toward said supporting body, and
   a second abutting body provided so as to protrude from said supporting body toward said wheel, wherein said first and second abutting bodies form a predetermined clearance, and enable said supporting body to rotate independently of said rotating mechanism within the predetermined range due to the predetermined clearance.

2. An acceleration sensor for use with an inclinable seat back, the acceleration sensor comprising:

a supporting body configured to be attached to a seat back such that said supporting body can rotate around an axis parallel to a center of rotation of the seat back;

a sensor ball supported by said supporting body such that a predetermined amount of acceleration applied to said supporting body causes said sensor ball to move and thereby drive an output member;

a weight coupled to said supporting body which applies torque to said supporting body and thereby urges said supporting body to a predetermined angle with respect to a horizontal plane; and a rotating mechanism drivingly engaged with a reclining mechanism of the reclining seat back such that said rotating mechanism rotates in accordance with an inclination of the reclining seat back, said rotating mechanism further comprising a first abutting body provided so as to protrude from said rotating mechanism toward said supporting body and a second abutting body provided so as to protrude from said supporting body toward said rotating mechanism, whereby said first and second abutting bodies form a predetermined clearance which limits the independent rotation of said supporting body to a predetermined range.

\* \* \* \* \*